Dec. 5, 1933.     J. H. TAYLOR     1,937,606
METHOD OF ATTACHING NOZZLES TO HOLLOW BODIES
Filed March 9, 1932
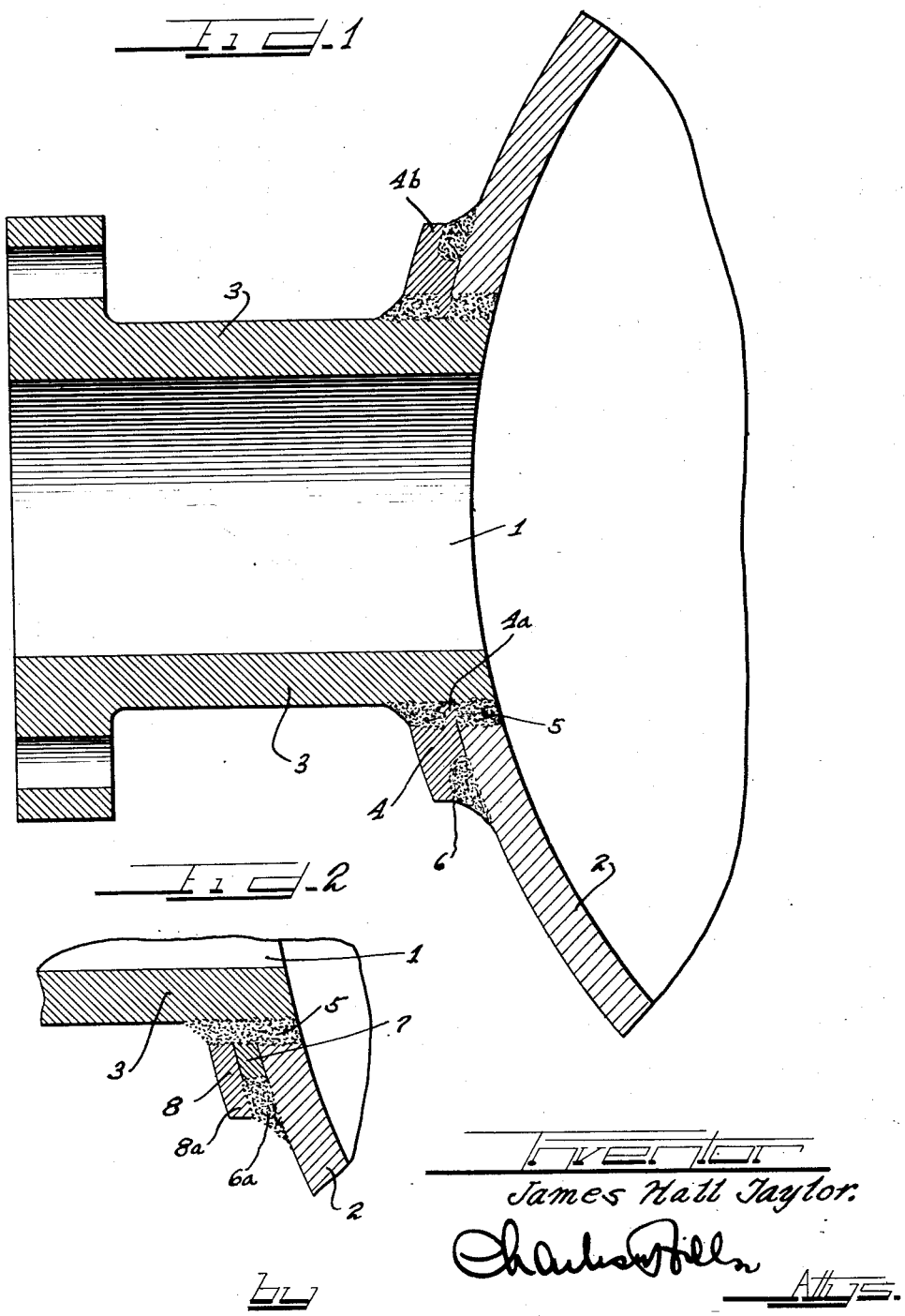

Patented Dec. 5, 1933

1,937,606

UNITED STATES PATENT OFFICE 1,937,606

METHOD OF ATTACHING NOZZLES TO HOLLOW BODIES

James Hall Taylor, Oak Park, Ill.

Application March 9, 1932. Serial No. 597,764

9 Claims. (Cl. 29—157)

This invention relates to a method for reinforcing and attaching a nozzle to a hollow body.

The object of the invention is to provide a method that greatly reduces the time and labor heretofore required for attaching a nozzle to a hollow body and that produces a welded joint that will readily cool without cracking adjacent parts through contraction, and produces a more reliable and safe connection.

It might be mentioned that the resulting high speed by which the method can be carried out arises from the fact that the puddling groove allows a higher temperature in welding or a more liquid welding metal to be used and also from the fact that the parts require only two positions for completely filling a welding groove.

The invention comprises the novel method and the joint formed thereby hereinafter described and more particularly pointed out and defined in the appended claims.

In the accompanying drawing which illustrates a joint formed by my novel method and in which similar reference numerals refer to similar features in the different views:

Figure 1 illustrates a fragmentary sectional view through a nozzle and hollow body welded together in accordance with my novel method. Figure 2 is a fragmentary sectional view of a welded joint between a nozzle and hollow body involving a slight modified form of my novel method.

In accordance with this invention, an aperture 1 is formed in the hollow body 2 larger than the size of the body of the nozzle 3 which is to be attached to such hollow body. A metal ring 4 is then formed with the interior opening thereof suitable for receiving the end of a nozzle, and with a damming element 4ª which is adapted to bridge the welding groove 5 which is formed between the nozzle 3, said ring 4 and the hollow body 2. The ring 4 is further formed with a surface to fit the surface of the hollow body and with an annular relatively deep recess 6 in its outer margin to form a welding groove between such ring and the hollow body. This groove is made sufficiently deep so that a higher temperature or a more liquid welding metal may be used in order to speed up the process and so that oxidation with respect to the fusing metal will be largely eliminated. The lip or part 4ᵇ above the groove is adapted to yield downwardly during contraction.

In assembling the parts, the ring 4 is preferably first placed in position upon the hollow body and tack welded or temporarily secured thereto. The nozzle 3 is then inserted in the opening formed by the ring and hollow body, the dam 4ª maintaining the same in proper spaced relation. The groove 5 upon both sides of the dam is then filled with fusing welding metal. If desired, the ring 4 may first be permanently welded in position and the nozzle thereafter inserted and welded in position.

After the groove 5 has been filled with welding metal, and the same has cooled sufficiently, the hollow body is moved to bring the welding groove 6 in a substantially vertical plane or at any suitable angle to a horizontal plane, an arcuate portion, preferably the upper half of the groove 6 is then dammed up (by slowly fusing metal at the ends of such arcuate portion or placing a bridge or dam plate therein) and filled with fusing welding metal. The hollow body is then rotated through substantially 180° and the other portion of the groove 6 is filled with fusing welding metal.

Figure 2 illustrates a slight modification of the invention which consists in forming the ring of two parts designated 7 and 8. The part 8 overlaps the part 7 so as to form a relatively deep welding groove 6ª beneath such overlap. The overlapping portion 8ª of the part 8 constitutes a lip that is adapted to yield downwardly during contraction to avoid cracking of the parts.

It will be appreciated that this method can be carried on at a high speed and that much time and labor is saved. At the same time the deep welding groove eliminates most of the objectionable oxidation that usually takes place. Further the overhanging lip which can yield under contraction prevents cracking of the parts.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The herein described method of attaching a nozzle to a hollow body which consists in forming a ring with a welding space on the side adapted to be adjacent the hollow body and adjacent the outer margin thereof, tack welding said ring to said hollow body, inserting said nozzle in said ring and welding the same thereto, positioning said body to bring said welding space in an angle to a horizontal plane, damming a portion of said space and filling said portion with fusing welding metal, rotating said hollow body and filling the remainder of said space with fusing welding metal.

2. The herein described method of attaching a nozzle to a hollow body which consists in forming a ring-like structure with a welding space on the side adapted to be adjacent said hollow body, inserting said nozzle into said structure, welding the same thereto, moving said body to bring said welding space into a plane at an angle to a horizontal plane, damming a portion of said space and filling the same with fusing welding metal, rotating said hollow body and filling the remainder of said space with fusing welding metal.

3. The herein described method of reinforcing and attaching a nozzle to a hollow body having an aperture, which consists in forming a ring-like reinforcing structure with a welding space on that side adapted to be adjacent the hollow body and adjacent the outer periphery thereof, positioning said structure upon said hollow body over said aperture, temporarily attaching the same thereto, inserting said nozzle in said ring-like structure and in said aperture, welding the same therein and then filling said welding space with fusing welding metal by damming up portions thereof and successively filling said portions with fusing welding metal.

4. The herein described method of reinforcing and attaching a nozzle to a hollow body which consists in forming a ring-like structure with a welding space on that side adapted to be adjacent said hollow body and extending inwardly from the outer periphery thereof, positioning said structure upon said hollow body, moving said hollow body to bring said welding space into a plane at an angle to a horizontal plane, filling said space with fusing welding metal and welding said nozzle within said structure.

5. The herein describe method of reinforcing and attaching a nozzle to a hollow body which consists in forming a ring-like structure with an inner damming plate and a welding space upon that side adapted to be adjacent said hollow body and extending inwardly from the outer periphery thereof, positioning said structure upon said hollow body, welding the same thereto and welding the nozzle within said structure.

6. The method of welding the end of a thick metal tube to a hollow body which consists in forming a ring-like reinforcing structure with a welding space on that side adapted to be adjacent said hollow body and extending inwardly from the outer periphery thereof and with a portion adapted to overlie the hollow body, positioning said structure upon said hollow body, welding the end of said tube in said structure and filling said space with fusing welding metal, said overhanging portion flexing downwardly to compensate for contraction of said welding metal.

7. The method of reinforcing and attaching a nozzle to a hollow body which consists in forming a ring-like structure with a welding space upon that side adapted to be adjacent the hollow body and extending inwardly from the outer periphery thereof, positioning said structure upon said hollow body, moving said hollow body to bring said welding space into a plane at an angle to a horizontal plane, damming a portion of said space and filling the same with fusing welding metal, moving said hollow body, filling the remainder of said space with fusing welding metal and welding said nozzle within said structure.

8. The method of reinforcing a hollow body around a nozzle aperture which consists in forming a ring-like structure with a deep welding space upon that side adapted to be adjacent said hollow body and extending inwardly from the outer periphery thereof, positioning said structure upon said body around said aperture, moving said body to bring said welding space into a plane at an angle to a horizontal plane, damming a portion of said space, filling the same with fusing welding metal, and then rotating said body and filling the remainder of said space with fusing welding metal.

9. The method of attaching a nozzle to a hollow body having an aperture which consists in forming a ring with a welding space upon that side adapted to be adjacent said hollow body and extending inwardly from the outer periphery, positioning and maintaining said ring upon said hollow body around said aperture, inserting said nozzle within said ring and aperture, filling the space between said nozzle and ring with fusing welding metal, moving said hollow body to bring said welding space in a plane at an angle to a horizontal plane, damming a portion of said space and filling the same with fusing welding metal, and then rotating said hollow body and filling another portion of said space with fusing welding metal.

JAMES HALL TAYLOR.